United States Patent [19]
Malen et al.

[11] 3,764,702
[45] Oct. 9, 1973

[54] TREATMENT OF THROMBOSIS

[75] Inventors: Charles Malen, Fresnes Village; Bernard Danree, St-Germain-en-Laye Village; Pierre Desnoyers, Fontenay-aux-Roses Village, all of France

[73] Assignee: Science Union et Cie, Societe Francaise de Recherche Medicale, Suresnes, France

[22] Filed: Dec. 7, 1970

[21] Appl. No.: 95,957

[30] Foreign Application Priority Data
Dec. 16, 1969 Great Britain .................. 61,279/69

[52] U.S. Cl. ............. 424/317, 260/473 R, 260/520, 424/329
[51] Int. Cl. ............................................ A61k 27/00
[58] Field of Search .................... 424/317; 260/519, 260/520, 473 R

[56] References Cited
UNITED STATES PATENTS
2,128,901   9/1938   Bass ................................ 260/473 R
FOREIGN PATENTS OR APPLICATIONS
2,000,299   7/1970   Germany ........................... 260/519

OTHER PUBLICATIONS
Schueler, Molecular Modification in Drug Design Advances in Chem. Series 45, ACS, 1964 p. ii, 221–222.
Chem. Abs., Vol. 73, 1970 No. 56088j
Chem. Abs., Vol. 57, 1962 pg. 14378d

*Primary Examiner*—Albert T. Meyers
*Assistant Examiner*—A. P. Fagelson
*Attorney*—Gordon W. Hueschen and Talivaldis Cepuritis

[57] ABSTRACT

Pharmaceutical composition containing therapeutically active 3-(parafluorobenzyloxy) benzoic acid successfully used in the treatment of thrombosis.

2 Claims, No Drawings

TREATMENT OF THROMBOSIS

The present invention provides a new pharmaceutical preparation comprising 3-(para-fluorobenzyloxy) benzoic acid of formula I :

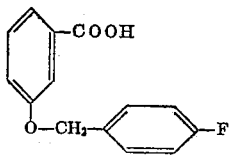

or a physiologically tolerable salt thereof, in admixture or conjunction with a pharmaceutically suitable carrier.

The compound of formula I is known and may be prepared by a method known per se which comprises the reaction of a benzyl halide of the general formula II :

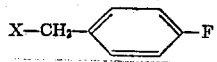

wherein X represents a halogen atom,
with meta-hydroxybenzoic acid of formula III :

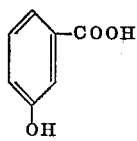

then the so-obtained ester of formula IV :

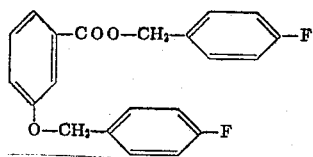

is saponified.

The reaction of the derivatives II and III may be carried out in a suitable solvent, such, for example, as an aliphatic alcohol, an ether, a ketone, a hydrocarbon, an aliphatic nitrile, nitromethane, dimethylformamide or dimethylacetamide, at a temperature within the range of from 20° to 150° C, in the presence of an acceptor for the hydrohalic acid formed during the reaction. This acceptor may be an alkali or alkaline earth metal salt of carbonic acid, such, for example, as sodium or potassium carbonate.

3-(para-fluorobenzyloxy) benzoic acid may be converted into addition salts with mineral or organic bases such, for example, as alkaline or alkaline earth metals hydroxides, primary, secondary and tertiary amines, such as mono-, di- and triethylamines, and heterocyclic bases such, for example, as piperazine, piperidine, morpholine, etc . . . These salts are also included in the present invention.

The compound of formula I and its physiologically tolerable salts possess valuable pharmacological and therapeutic properties, especially thrombolytic and fibrinolytic properties, and decrease the platelet-stickiness and aggregation and the capillary permeability.

The thrombolytic activity was studied in vitro by the method of Von Kaulla (Thromb. Diath. Haem. 5, 489 (1961)) on the standard blood clot. It was observed that the product provokes the lysis of the clot at 0,03 to 0,02 molar concentrations, corresponding to concentrations between 9,6 and 6,4 mg/ml.

The same activity was demonstrated in vivo by the method of Roschlau (Can. J. Biochem. Phys. 40, 1819 (1962)). 500 mg/hour of the product perfused for 6 hours in the dog, permit the dissolution of the arterial thrombus in 75 percent of the cases.

A similar effect may be observed in vivo by the method of S. Wessler (J. Clin. Invest. 34, 647 (1955)).At the dose of 25 mg/kg i.v., the compound inhibits the thrombosis in the rabbit's vena jugularis provoked by injection of a heterologous serum.

When administered orally at the dose of 100 mg/kg in rat, the compound decreases to 48 percent the euglobulin lysis time 60 minutes after administration (Von Kaulla : Am. J. Clin. Path. 29 104 (1958)).

The compound decreases also the capillary permeability. By the test of Ambrose and Eds (J. Pharm. Exp. Therap. 90, 359 (1947)), it was observed that it increases to 3, 5 times the delay of appearance of the coloration on the rabbit's depilated abdominal skin of 2 cm3 of Trypan blue at 1 percent, when administered intraperitoneally at 100 mg/kg.

By using the Salzman method (J. Lab. Clin. Med. 62, 724 (1963)), it was observed that the product decreases by 11 percent the platelet stickiness 1 hour after the administration of 100 mg/kg P.O.

The effect of the compound on the platelet aggregation was evidenced by the photometric technique of Born and O'Brien, modified by Sinakos and Caen (Rev. Fr. Et. Clin. Biol. 11, 538 (1966)). A concentration of 500 to 750γ/ml of the compound inhibits by 100 percent the platelet aggregation provoked by thrombine in the rat and rabbit plasma.

The toxicity of the compound shows a $LD_{50}$ of 300 mg/kg i.v. and 1500 mg/kg P.O. in mice.

The compound may be used successfully in therapy, especially in the treatment of thrombosis in a living animal body afflicted with the same.

The compound of formula I, or a physiologically tolerable salt thereof, can be administered especially by intravenous route in form of solutions in distilled water, isotonic sodium chloride or glucose. The doses may be of 5 to 50 mg/kg, preferably 5 to 10 mg/kg/hour for 3 to 6 hours. The pharmaceutical dosage unit form contains from 100 to 1000 mg. of the active ingredient.

The following examples illustrate the invention. The melting points were obtained on a Kofler block (K) or a Kofler heater under a microscope (M.K.).

EXAMPLE 1 :

3-(para-fluorobenzyloxy) benzoic acid :

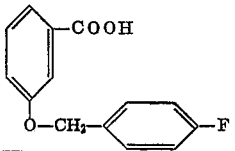

34.5 g (0.25 mole) of dry and powdered potassium carbonate were added to a solution of 6.9 g (0.05 mole) of meta-hydroxybenzoic acid in 60 ml of dimethylformamide. The suspension was heated up to 100 °C and 21.5 g (0.12 mole) of para-fluorobenzyl chloride were dropped, while stirring.

The mixture was maintained at 100 °C, while stirring, for one hour then it was cooled and diluted with 200 ml of water. The white precipitate was suctioned off, washed with water and dried. 20.5 g of para-fluorobenzyl 3-(parafluorobenzyloxy) benzoate, melting (K) at 74–75°° C, were obtained.

This ester was saponified with 70 ml of a 10 percent hydroalcoholic solution of potassium hydroxide, while refluxing for 2 hours.

The para-fluorobenzyl alcohol was extracted with ether and the aqueous alkaline phase was acidified with a 2 N solution of hydrochloric acid. The so-obtained acid was suctioned off, washed with water and dried. 11.2 g of 3-(parafluorobenzyloxy) benzoic acid, melting (M.K.) at 150–152° C, were obtained.

5.6. of diethylamine were added to a suspension of 8 g of 3-(parafluorobenzyloxy) benzoic acid in 70 ml of ethanol. 15 minutes later, the ethanol was evaporated under vacuum and the residue was recrystallized in a mixture of 20 ml of cyclohexane and 5 ml of benzene. 6 g of diethylammonium 3-(para-fluorobenzyloxy) benzoate, melting (M.K.) at 81°–83° C, were obtained.

EXAMPLE 2

| | |
|---|---|
| Diethylammonium 3-(para-fluorobenzyloxy) benzoate | 1 g |
| Glucose | 25 g |
| Bidistilled water, q.s.p. | 500 g | for intravenous perfusion for 3 hours.

What we claim is :

1. A method of treating a living animal body, afflicted with thrombosis, which consists in administering to said living animal body by the intravenous route an amount of 3-(para-fluorobenzyloxy) benzoic acid or the diethylammonium salt thereof effective for alleviation of said thrombosis.

2. The method of Claim 1, wherein the amount administered is 5 to 50 mg/kg and the period of administration is up to 6 hours.

* * * * *